United States Patent [19]
Moore et al.

[11] Patent Number: 5,162,976
[45] Date of Patent: Nov. 10, 1992

[54] DOUBLE HOUSING WALL SECURITY LOCKING APPARATUS FOR A COMPUTER

[75] Inventors: Donald E. Moore, Houston; Joseph R. Fester, Tomball, both of Tex.

[73] Assignee: Compaq Computer Corporation, Houston, Tex.

[21] Appl. No.: 722,529

[22] Filed: Jun. 27, 1991

[51] Int. Cl.$^5$ .................. H05K 7/00; G06F 1/00; E05B 73/00
[52] U.S. Cl. .................. 361/393; 70/58; 361/391
[58] Field of Search .................. 70/58, 78, 84, 380; 312/257.1, 263, 291, 333; 361/390, 391, 392, 393, 394, 395, 399, 415; 364/708

[56] References Cited

U.S. PATENT DOCUMENTS

| | | | |
|---|---|---|---|
| 2,266,857 | 12/1941 | Field | 312/291 X |
| 4,786,785 | 11/1988 | Felt | 312/291 X |
| 4,980,676 | 12/1990 | Nomura et al. | 364/708 X |
| 5,052,199 | 10/1991 | Derman | 70/58 |

Primary Examiner—Leo P. Picard
Assistant Examiner—Michael W. Phillips
Attorney, Agent, or Firm—Konneker & Bush

[57] ABSTRACT

An AC-powerable portable computer has an interior sheet metal chassis portion within which computer operating components are operatively disposed. The chassis has a removable metal access wall portion and is positioned within a plastic outer housing of the computer having a removable access wall that outwardly overlies the sheet metal access wall portion. A key-operable security locking system incorporated in the computer has a pawl portion positioned within the sheet metal chassis. The pawl is selectively movable to a locking position in which it interlocks with each of the plastic and sheet metal access walls and precludes their normal removal from the computer. When the plastic and sheet metal access walls are locked to the computer in this manner, entry into the chassis interior requires that the plastic access wall be broken, and that the metal access wall be forcibly bent away from the balance of the chassis structure. Accordingly, the access walls cannot be reinstalled on the computer without leaving readily visible evidence of the forcible entry into the computer. The locking system thus provides a dual barrier to unauthorized physical entry into the chassis, and visually alerts the legitimate user of the computer that a break-in has been attempted or achieved.

13 Claims, 2 Drawing Sheets

DOUBLE HOUSING WALL SECURITY LOCKING APPARATUS FOR A COMPUTER

BACKGROUND OF THE INVENTION

1. Field of the Invention

The present invention relates generally to computer apparatus and more particularly relates to security apparatus for inhibiting unauthorized physical entry into the interior of a computer.

2. Description of Related Art

The processing station of a desktop personal computer is customarily disposed within the interior of a relatively heavy gauge metal housing. Access to the operating components of the computer located within the housing, such as the disc drives, central processor and memory chips, is typically provided by rearwardly removing a generally U-shaped top and side hood portion of the housing which slidably interlocks with a base portion of the housing.

To prevent, or at least substantially inhibit, unauthorized entry into the interior of the housing, a key lock structure is generally provided on the front of the housing. The lock structure has a latch portion which is disposed within the housing and may be rotated to internally block removal of the housing hood until the key owner unlocks it.

Because the typical desktop computer housing is formed from a relatively heavy gauge metal, this simple housing security lock structure has proven to be quite effective in preventing unauthorized entry into the housing interior. The housings of portable computers, however, are constructed quite differently due to the necessity of keeping the overall weight of the computer as low as possible.

For example, the housing of a conventional AC-powerable portable computer is generally formed from a light gauge sheet metal inner chassis portion positioned within a lightweight plastic outer housing. The computer's processing and other operating components are housed within the sheet metal chassis. A sheet metal panel is removably secured with screws to the balance of the chassis over an opening therein that provides access to the interior of the chassis and the operating components therein. Overlying this thin metal panel is a plastic wall section which is removably secured with screws to the balance of the overall housing structure to conceal the metal chassis structure.

While this plastic/metal housing construction is quite useful in providing the portable computer with its requisite light carrying weight, it also tends to facilitate the unauthorized physical entry into the interior of the computer. For example, with this conventional dual wall housing construction it is a fairly easy and rapid task to surreptitiously retrieve sensitive user data from the computer. All that is necessary is to simply unscrew and remove the plastic and sheet metal housing access panels, disable the user data access code, retrieve the previously guarded data, reinstate the access code, and then reinstall the plastic and metal access panels.

When the legitimate user of the computer returns, there is typically no physical or electronic indication whatever that this data thievery has occurred. This lack of evidence of unauthorized physical entry into the computer interior would exist even if, as in the case of desktop computer housings, the sheet metal access panel were to be internally latched to the balance of the metal housing portion of the computer. Any visual evidence of a previous computer break-in would simply be hidden from view by the reinstalled outer plastic housing access panel.

It can readily be seen from the foregoing that a need exists for apparatus for substantially inhibiting the unauthorized physical entry into the interior of a portable computer having a dual plastic/metal housing structure generally as described above. It is accordingly an object of the present invention to provide such apparatus.

SUMMARY OF THE INVENTION

In carrying out principles of the present invention, in accordance with a preferred embodiment thereof, a specially designed security locking means are incorporated in a computer having a housing including a sheet metal inner housing structure having an interior within which operating components of the computer are disposed, an access opening communicating with the interior, and a removable metal access wall portion extending across and blocking the access opening. The sheet metal inner housing structure is positioned within a plastic outer housing structure having a removable plastic access wall portion outwardly overlying the metal access wall.

The security locking means are operative to selectively lock the plastic and sheet metal access walls to the balance of the computer housing in a manner preventing their removal without causing visible damage thereto, whereby a legitimate user of the computer may readily detect a previous unauthorized entry into the interior of the sheet metal inner housing structure through its access opening.

In a preferred embodiment thereof, the security locking means include a latch member supported within the computer housing for movement relative thereto between a locking position in which the latch member lockingly engages each of the plastic and sheet metal access walls and prevents their normal removal from the balance of the computer housing, and a release position in which the latch member is disengaged from the two access walls and permits their normal removal from the balance of the computer housing. Key operable means, accessible from the exterior of the computer housing, are provided for moving the latch member to, and releasably holding it in, a selected one of its locking and release positions.

When the plastic and sheet metal access walls are lockingly secured by the latch member, entry into the inner metal housing structure through its access opening requires that the plastic access wall be broken, and that the metal access wall be forcibly bent away from the balance of the metal housing. Accordingly, the two access walls cannot be reinstalled on the computer without leaving readily visible evidence of the forcible entry into the computer. The locking means thus provide a dual barrier to unauthorized physical entry into the inner metal housing, and visually alerts the legitimate user of the computer that a break-in has been attempted or achieved.

DETAILED DESCRIPTION

Figure 1:
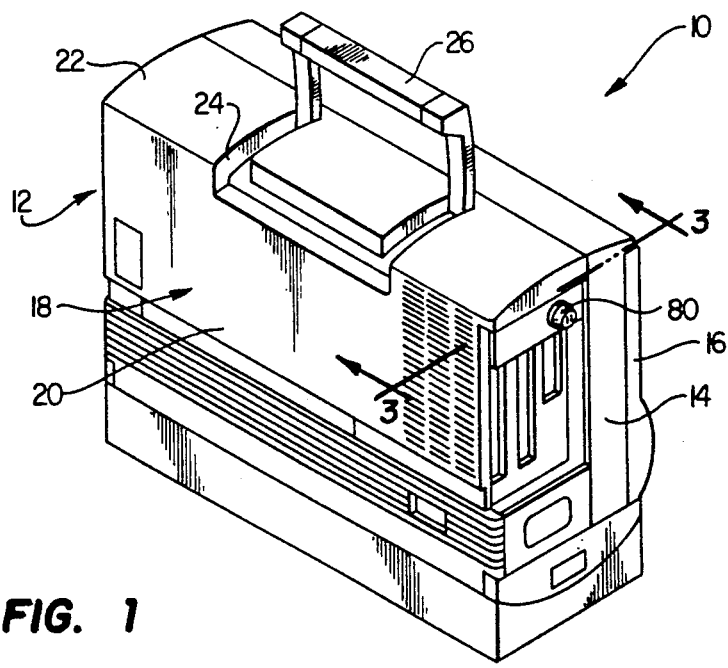
FIG. 1 is a simplified near side perspective view of a representative AC-powerable portable computer incorporating therein a double housing wall security locking system embodying principles of the present invention.

Perspectively illustrated in FIG. 1 is a representative AC-powerable portable computer 10 which is provided with a specially designed housing locking system which embodies principles of the present invention and will be subsequently described herein. The computer 10 includes a plastic outer housing structure 12, a display screen housing 14 secured to the front side of housing structure 12, and a keyboard 16 removably latched in a conventional manner to the front side of the display screen housing.

Figure 2:
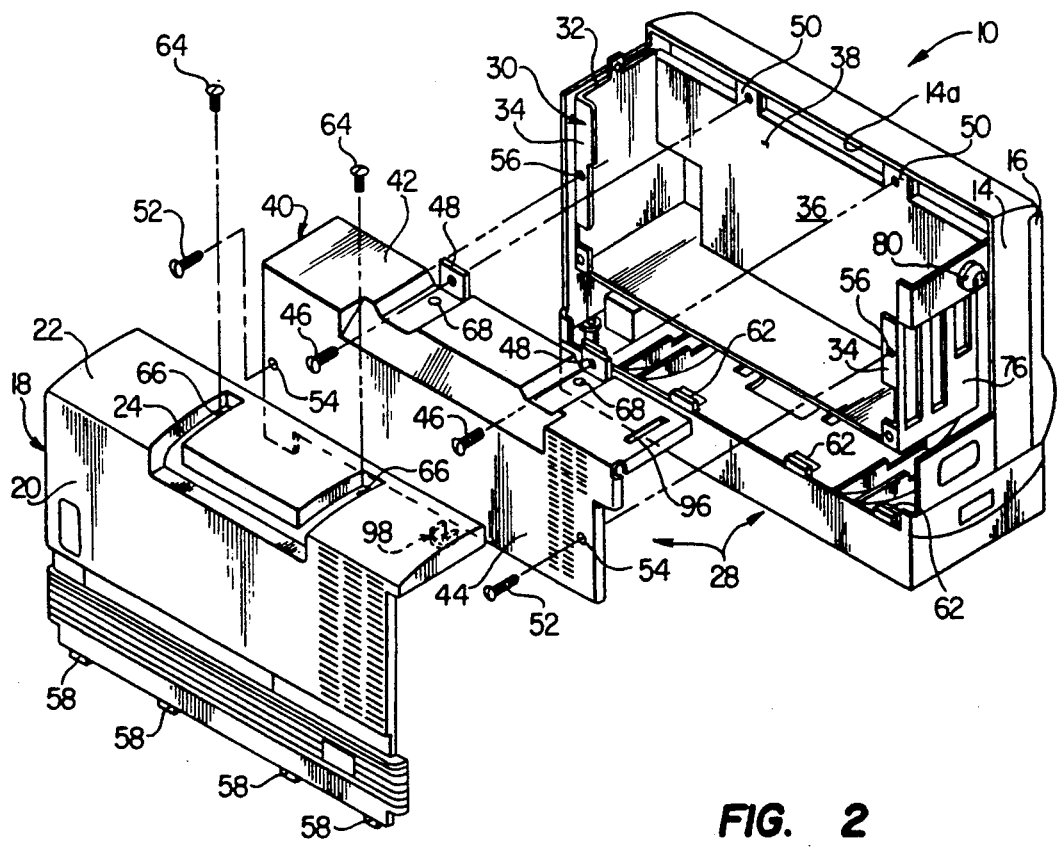
FIG. 2 is a partially exploded rear side perspective view of the portable computer.

As shown in FIGS. 1 and 2, the plastic outer housing 12 is provided with a generally L-shaped access wall 18 having a rear wall portion 20 and a top wall portion 22 in which a recessed area 24 is formed to receive a pivotally mounted carrying handle 26 on its downwardly pivoted storage position. In a manner subsequently described, the access wall 18 is removably securable to the balance of the computer over a relatively light gauge sheet metal chassis structure 28 (FIG. 2) disposed within the interior of the computer. Housed within the chassis 28 are the central processing and other operating systems (not shown) of the computer.

Chassis 28 includes a body portion 30 which is suitably secured within the interior of the computer and has open top and rear sides 32,34 and a front wall 36. Open top and rear sides 32,24 collectively define an access opening leading to the interior 38 of chassis 28, within which the aforementioned operating systems of the computer are housed.

This access opening is normally covered by a generally L-shaped sheet metal wall structure 40 (see FIGS. 2 and 3) having top and rear side walls 42,44. Wall structure 40 is removably securable to the chassis body portion 30 by a pair of screws 46 extended through mounting tabs 48,50 respectively positioned on the front edge of wall 42 and the top edge of wall 36, and by a pair of screws 52 threaded into openings 54,56 respectively formed in rear side wall 44 and the rear side 34 of the chassis body portion 30.

The removable plastic wall structure, as illustrated in FIG. 2, has a spaced series of downwardly projecting tabs 58 on the bottom edge of its rear wall 20, and a spaced series of forwardly projecting tabs 60 (see FIG. 3) at the front edge of its top wall 42. With the sheet metal wall structure 40 fastened in place on the chassis body portion 30 as described above, the plastic wall structure 18 is removably secured in place in an outwardly overlying relationship with metal wall structure 30 by inserting the tabs 58 in corresponding slots 62 formed in a lower rear portion of the computer housing. The wall structure 18 is then pivoted forwardly about the inserted tabs 58 until its front tabs 60 are forced under a top rear edge portion 14 of the display screen housing 14 as can be best seen in FIG. 3. Finally, the plastic wall structure 18 is removably fastened in place over the sheet metal wall structure 40 using a pair of screws which are extended downwardly through openings 66 in the top plastic wall handle recess area 24 and threaded into underlying openings 68 formed in the top sheet metal wall 42.

Assembled in this manner, the computer 10 potentially provides easy and rather rapid access to its operating components disposed within the metal chassis structure 28 simply by unscrewing and removing the plastic and metal wall structures 18,40 as shown in FIG. 2. Such easy and rapid access to the chassis interior 38, characteristic of conventionally constructed portable computers, undesirably facilitates the unauthorized physical entry into the chassis interior while the legitimate user of the computer is away from it. This permits an unauthorized user of the computer to simply disable its access pass code, read the previously secured data stored in the computer's memory, reset the pass code and then quickly reattach the wall structures 18,40. After this is done, there is no evidence that data security has in any manner been breached.

In a simple, inexpensive and highly effective manner the present invention provides a solution to this previously existing problem by incorporating in the computer 10 a specially designed security locking system 70 which will now be described in conjunction with FIGS. 2-4. Security locking system 70 includes a generally conventional lockset 72 operable by a key 74 and mounted on an upper end portion of the right end wall 76 of the metal chassis body portion 30.

Lockset 72 has an internal lock cylinder 78, rotatable in opposite directions by key 74, and projects into the interior 38 of the sheet metal chassis 28. The inner end of the rotatable lock cylinder 78 has formed thereon a rectangular projection 84 that extends through a rectangular opening in the circular inner end 86 of an elongated locking pawl 88 extending transversely to the lock cylinder. As illustrated in FIGS. 1 and 2, an outer end portion 80 of the lockset is key-accessible from the exterior of the computer.

The inner end 86 of pawl 88 is fixedly secured to the inner end of lock cylinder 78, for rotation therewith, by expanding the lock cylinder end projection 84 in a rivet-like manner, thereby captively retaining the pawl 88 on the lock cylinder 78. For purposes later described, the outer end of the pawl 88 has a pair of longitudinally spaced apart transverse tabs 90 and 92 thereon that form a slot 94 therebetween.

Figure 3:
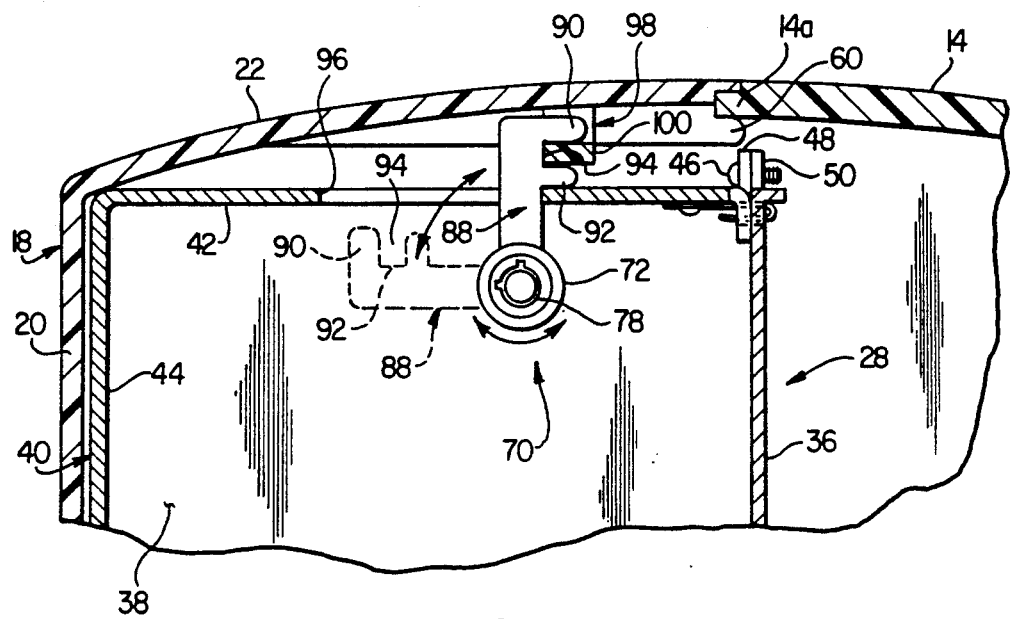
FIG. 3 is a simplified, enlarged scale partial cross-sectional view through the portable computer taken along line 3—3 of FIG. 1.
Figure 4:
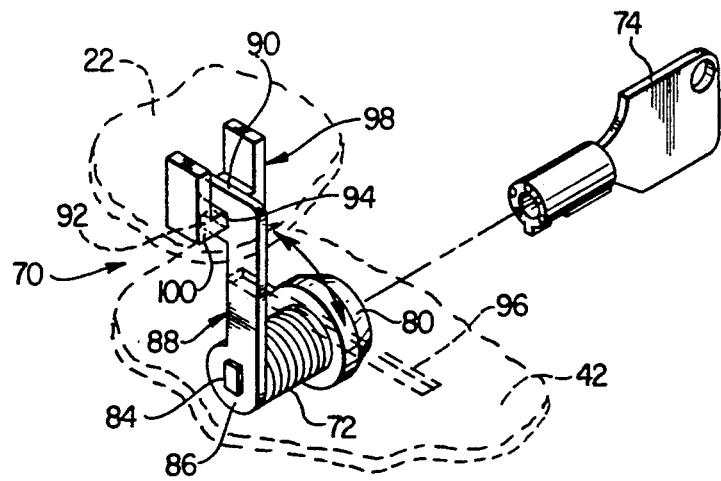
FIG. 4 is a partially phantomed perspective detail view of the security locking system and adjacent computer housing wall portions.

As can best be seen in FIG. 3, by rotating the inserted key 74, the pawl 88 may be rotationally driven between a dotted line release position, in which the pawl is generally horizontally oriented, and a solid line locking position in which the pawl is vertically oriented with the other end of the pawl being positioned above the inner end of the lockset 72. When the pawl 88 is in its dotted line release position, the locking system 70 is inoperative and the outer plastic and inner metal closure wall structures 18,40 may be quickly removed in their normal manner—i.e., by simply unscrewing them and separating them from the balance of the computer to expose the interior 38 of the sheet metal chassis structure 28.

However, as the pawl 88 is key-driven toward its solid line locking position the outer pawl end swings upwardly through an elongated slot 96 formed through the top sheet metal wall 42. When pawl 88 reaches its vertical locking position, the pawl projection 92 closely overlies the top surface of the upper sheet metal wall 42 at the right end of the slot 96 as viewed in FIG. 3.

A generally U-shaped locking (i.e., hollow) bracket 98, having a bottom wall 100, is molded integrally with and depends from the upper plastic wall 22. With the plastic and metal closure wall structures 18,40 operatively installed as shown in FIG. 3, the bottom bracket wall 100 is positioned above and just to the right of the right end of the wall slot 96. As the pawl 88 reaches its vertical locking position, the bottom bracket wall 100 enters the pawl end slot 94, and the pawl projection 90 enters the interior of the hollow bracket 98 and closely overlies its bottom wall 100.

When the pawl 88 is rotated to its vertical locking position and the key 74 is removed from the lockset 72, the lockset operates in a conventional manner to prevent rotation of the lock cylinder 78 until the key is later used to rotate it. With the pawl 88 rotationally locked in this manner, the pawl functions to lock the plastic and metal closure wall structures 18,40 to the balance of the computer. More specifically, it can be seen in FIG. 3 that the pawl projections 90,92 block upward movement of the wall structures 18,40 relative to the balance of the computer, while a right side edge portion of the elongated pawl body blocks leftward movement of these two closure wall structures relative to the balance of the computer.

This substantially inhibits unauthorized physical entry into the interior 38 of the sheet metal chassis structure 28. For example, after the retaining screws 64 (FIG. 2) are removed, it is necessary to rearwardly pivot and then lift the plastic wall structure 18 to disengage its tabs 58,60 from their associated slots 62 and wall edge 14$_a$ and permit removal of the wall structure 18. However, this necessary movement of the wall structure 18 is precluded by the internal locking system 72 just described. Accordingly, with the pawl 88 in its locking position the plastic closure wall structure 18 must be broken to remove it from the computer. This cooperation between the previously described wall tab interlocks and the security locking system 70 thus provides a readily visible indication that at least an attempt has been made to break into the interior of the computer.

Even if the plastic closure wall structure 18 is forcibly broken off the computer, the locking system 70 still functions to firmly secure the sheet metal closure wall structure 40 in place over the access opening leading into the interior 38 of the chassis 28. This presents a second barrier to unauthorized physical entry into the interior of the computer, and the sheet metal wall structure 40 must be forcibly bent in an outward direction to provide such entry.

Accordingly, subsequent to an unauthorized forced entry into the computer interior the wall structures 18,40 cannot be reinstalled without leaving readily visible signs (i.e., a broken plastic wall and a bent sheet metal wall) that a break-in has occurred. The unique security locking system 70 of the present thus creates a dual barrier to unauthorized computer entry, and also desirably provides visual confirmation when either or both of such barriers have been breached.

The foregoing detailed description is to be clearly understood as being given by way of illustration and example only, the spirit and scope of the present invention being limited solely by the appended claims.

What is claimed is:

1. A computer within which computer operating components are operatively disposed, comprising:
   a housing including:
   an inner housing structure having an interior, an access opening communicating with said interior, and a removable first wall portion extending across and blocking said access opening, and
   an outer housing structure enveloping said inner housing structure and having a removable second wall portion outwardly overlying said first wall portion; and
   means for selectively locking said first and second wall portions to the balance of said housing in a manner preventing their removal without causing visible damage thereto, whereby a legitimate user of the computer may readily detect a previous unauthorized entry into the interior of said inner housing structure through said access opening, said means for selectively locking including:
   a latch member supported within said housing movable relative thereto between a first position in which said latch member lockingly engages each of said first and second wall portions and prevents their normal removal from the balance of said housing, and a second position in which said latch member is disengaged from said first and second wall portions and permits their normal removal from the balance of said housing, and
   key operable means, accessible from the exterior of said housing, for moving said latch member to, and releasably holding it in, a selected one of said first and second positions thereof.

2. The computer of claim 1 wherein:
said computer is an AC-powerable portable computer,
said removable first wall portion is sheet metal, and
said removable second wall portion is plastic.

3. The computer of claim 2 wherein:
said housing has a front side portion, and
said computer further comprises a display screen housing secured to said front side portion, and a keyboard removably secured to said display screen housing over a front side portion thereof.

4. The computer of claim 1 wherein:
said removable first wall portion has an opening disposed therein,
said removable second wall portion has a hollow bracket portion formed on an inner side surface thereof, and
said latch member, in said first position thereof, extends through said first wall portion opening and lockingly engages said first wall portion and said bracket portion.

5. The computer of claim 4 wherein:
said latch member has an elongated body portion with longitudinally spaced apart first and second transverse projections formed thereon,
said first transverse projection, with said latch member in its first position, extending into said hollow bracket portion, and
said second transverse projection, with said latch member in its first position, outwardly overlying said first wall portion.

6. A portable computer within which computer operating components are operatively disposed, comprising:
an outer housing including:
a body portion having a first access opening therein, and
a first wall structure removably secured to said body portion over said first access opening and interlocked with said body portion in a manner requiring that said first wall structure be moved in a predetermined manner relative to said body portion in order to permit removal of said first wall structure from said body portion;

an inner housing including:
- a body portion having a second access opening therein which underlies said first access opening, and
- a second wall structure removably secured to said inner housing body portion, over said second access opening, and underlying said first wall structure; and latch means for internally locking said first and second wall structures to one another, and to the balance of said computer, said latch means being operative to prevent said first wall structure from being appreciably moved in said predetermined manner relative to said outer housing body portion, and to prevent the removal of said first and second wall structures without causing visible damage thereto.

7. The portable computer of claim 6 wherein:
said computer is an AC-powerable portable computer,
said outer housing is plastic, and
said inner housing is sheet metal.

8. The portable computer of claim 6 wherein:
said first and second wall structures have generally L-shaped configurations.

9. The portable computer of claim 6 wherein said latch means include:
- a latch member supported within said inner housing for movement relative thereto between a first position in which said latch member lockingly engages each of said first and second wall structures and prevents their normal removal from said computer, and a second position in which said latch member is disengaged from said first and second wall structures and permits their normal removal from said computer, and
- means, accessible from the exterior of said computer, for moving said latch member to, and releasably holding it in, a selected one of said first and second positions thereof.

10. The portable computer of claim 9 wherein said latch means include:
- a hollow bracket disposed on an inner side portion of said second wall structure,
- an opening disposed in said first wall structure and underlying said hollow bracket,
- and wherein said latch member in said first position extends through said opening and lockingly engages said hollow bracket and an outer side surface portion of said first wall structure.

11. The portable computer of claim 9 wherein said means for moving said latch member include:
- a key-operable lockset extending into said inner housing and drivably secured to said latch member.

12. A portable AC-powerable computer within which computer operating components are operatively disposed, comprising:
- a plastic outer housing having a first access opening therein;
- a first plastic wall structure removably secured to and interlocked with said outer housing over said first access opening;
- a hollow bracket disposed on an inner side portion of said first plastic wall structure;
- a sheet metal inner housing having a second access opening therein, said second access opening underlying said first access opening;
- a second sheet metal wall structure removably secured to said inner housing over said second access opening;
- an elongated slot disposed in said second sheet metal wall structure and underlying said hollow bracket;
- a key-operable lockset extending into said inner housing and having a rotatable inner end portion; and
- a latch member secured to said inner end portion of said lockset and rotatably drivable thereby between a first position in which said latch member is disposed within said inner housing, and a second position in which said latch member extends outwardly through said elongated slot and lockingly engages said hollow bracket and said second sheet metal wall structure.

13. The portable AC-powerable computer of claim 12 wherein:
said latch member has an elongated configuration with an outer end portion having spaced apart first and second projections formed thereon,
said first projection entering said hollow bracket and said second projection outwardly overlying said second sheet metal wall structure when said latch member is in said second position thereof.

* * * * *

UNITED STATES PATENT AND TRADEMARK OFFICE
CERTIFICATE OF CORRECTION

PATENT NO. : 5,162,976

DATED : November 10, 1992

INVENTOR(S) : Moore, Donald E. and Fester, Joseph R.

It is certified that error appears in the above-identified patent and that said Letters Patent is hereby corrected as shown below:

Column 3, line 23, "on" should be --in--.

Signed and Sealed this

Eleventh Day of January, 1994

*Attest:*

BRUCE LEHMAN

*Attesting Officer*     *Commissioner of Patents and Trademarks*